UNITED STATES PATENT OFFICE.

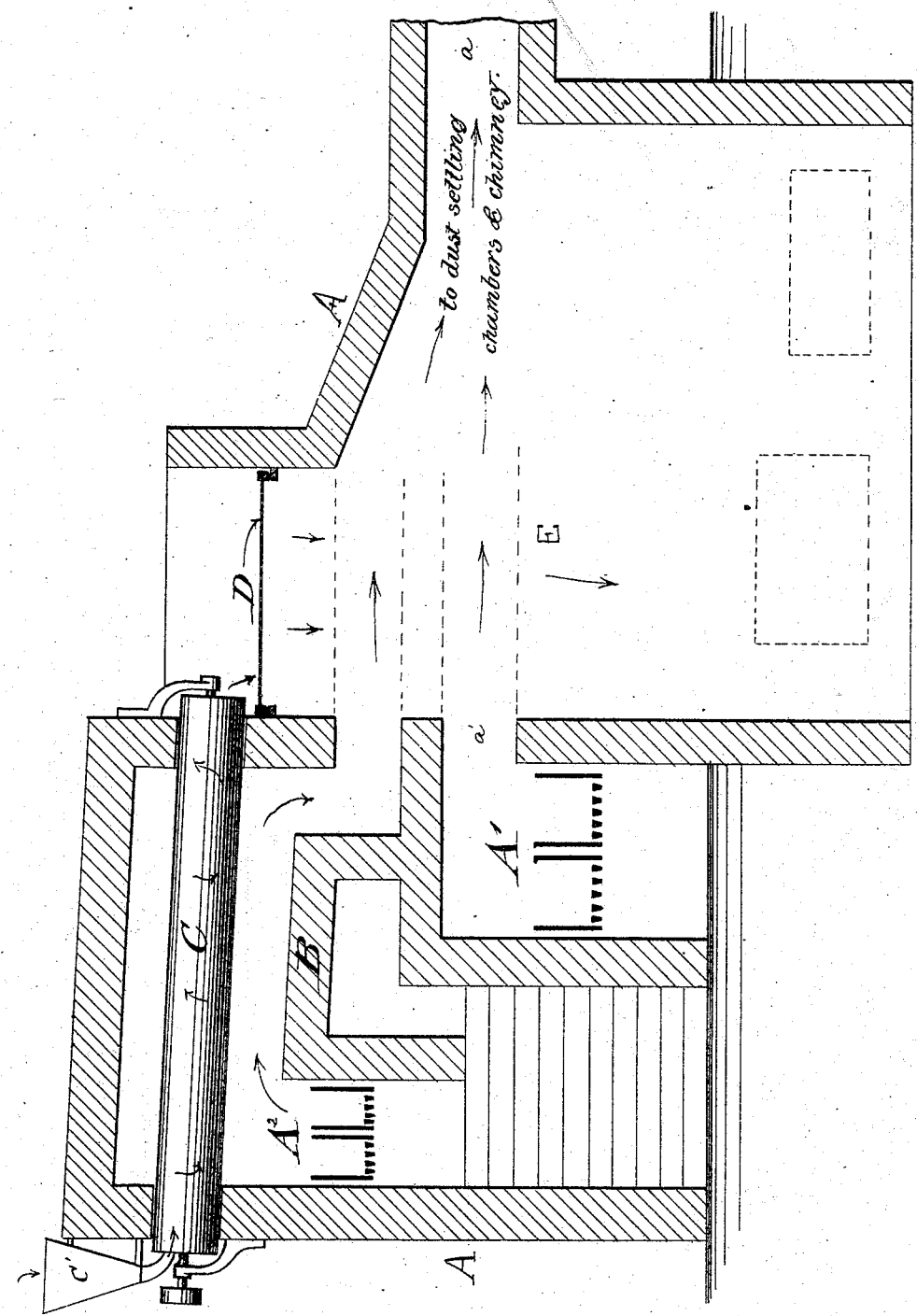

ERNST HEILIGENDORFER, OF BELMONT, NEVADA.

IMPROVEMENT IN ORE-ROASTING FURNACES.

Specification forming part of Letters Patent No. 157,515, dated December 8, 1374; application filed March 7, 1874.

*To all whom it may concern:*

Be it known that I, ERNST HEILIGENDORFER, of the city and county of Belmont, and State of Nevada, have invented a new and Improved Ore - Roasting Furnace; and I do hereby declare that the following is a full, clear, and exact description of the same, reference being had to the accompanying drawing forming a part of this specification, in which the drawing is a longitudinal sectional elevation.

The invention will first be fully described, and then pointed out in the claim.

A represents the apparatus for desulphurizing and purifying silver or other ores, provided with hopper C', leading into an inclined cylindrical heater, C, that empties the hot ore-pulp, or ground ore, upon a sieve, D. Under this sieve is a chamber, E, into which the horizontal flue $a'$ of the furnace $A^1$ discharges its flame and hot products of combustion. Directly opposite to the flue $a'$ is arranged a horizontal smoke-pipe, $a$, so as to produce a horizontal draft or current of the hot gases directly under the sieve D.

The operation is as follows: The ground ore is fed through hopper C' into heater C, through which it is gradually transferred by a screw or other means, while a furnace, $A^2$, or other device, is heating it. Its transfer through heater must not be so slow as to allow it to become sufficiently heated to cake, while it may be heated as nearly up to that point as possible. Having arrived on the sieve the ore is quickly spread over the surface thereof, so as to cause its particles to be subdivided in passing through the reticulations. The particles thus pass down from the sieve in numerous little streams, with a palpable space between them, so that the hot gases act readily on all sides of each particle, and thus make the operation thorough and completely effective.

Having thus described my invention, what I claim as new is—

The combination of heater C, sieve D, furnace $A^1$, having flue $a'$, chamber E, and smoke-pipe $a$, all arranged to operate in the manner described.

ERNST HEILIGENDORFER.

Witnesses:
   H. MÜNTER,
   W. B. SCHMIDT.